United States Patent

[11] 3,596,044

[72] Inventor Leonard Katzin
 Los Angeles, Calif.
[21] Appl. No. 803,812
[22] Filed Mar. 3, 1969
[45] Patented July 27, 1971
[73] Assignee California Institute of Technology
 Pasadena, Calif.

[54] THROUGH INSULATION WELDING SYSTEM
 11 Claims, 11 Drawing Figs.
[52] U.S. Cl................................................. 219/86,
 219/78, 219/91, 219/92
[51] Int. Cl................................................ B23k 9/28,
 B23k 11/10
[50] Field of Search........................................ 219/78, 79,
 117, 86, 107, 58, 91, 92; 29/625, 626

[56] References Cited
 UNITED STATES PATENTS
3,252,203  5/1966  Alberts et al. ................. 219/86 X
3,342,972  9/1967  Penberg ........................ 219/86 X Primary Examiner—J. V. Truhe
Assistant Examiner—Hugh D. Jaeger
Attorneys—Samuel Lindenberg and Arthur Freilich ABSTRACT: A welding system comprising first and second concentric electrodes which re positioned on one side of a terminal, to which an insulated electrical wire is to be welded. The wire extends through the inner electrode. The two electrodes, forming an electrode assembly, are lowered onto the terminal with a force sufficient to rupture the insulation, when the wire is squeezed between a welding tip of the inner electrode and the terminal. The outer electrode serves to guide the assembly with respect to the terminal and to provide electrical contact therewith. Welding is achieved by providing a welding pulse between the two electrodes, when the outer electrode is in electrical contact with the terminal, and the latter is in electrical contact with the welding tip of the inner electrode through the electrical wire with the severed insulation.

INVENTOR.
LEONARD KATZIN
BY Lindenberg & Freilich
ATTORNEYS

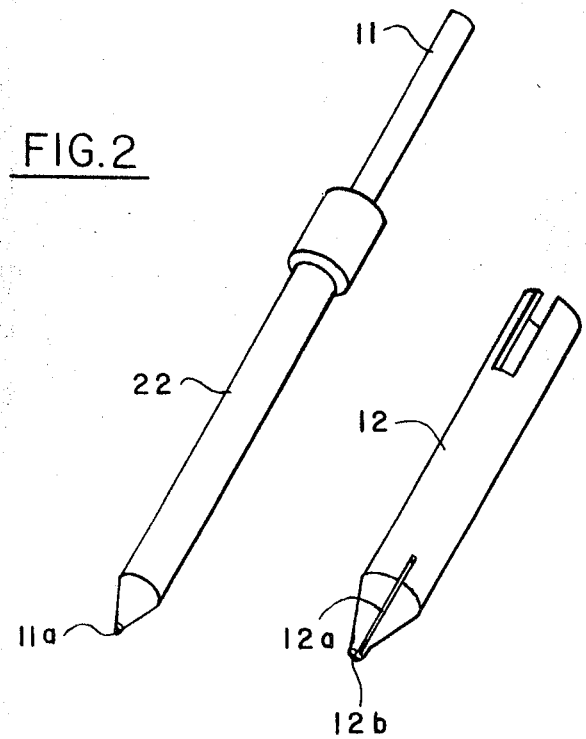
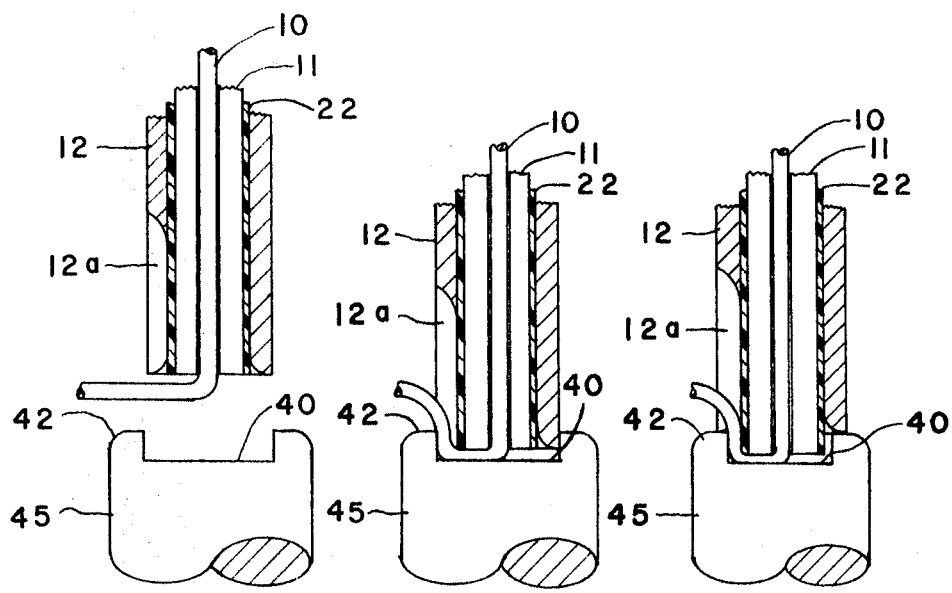

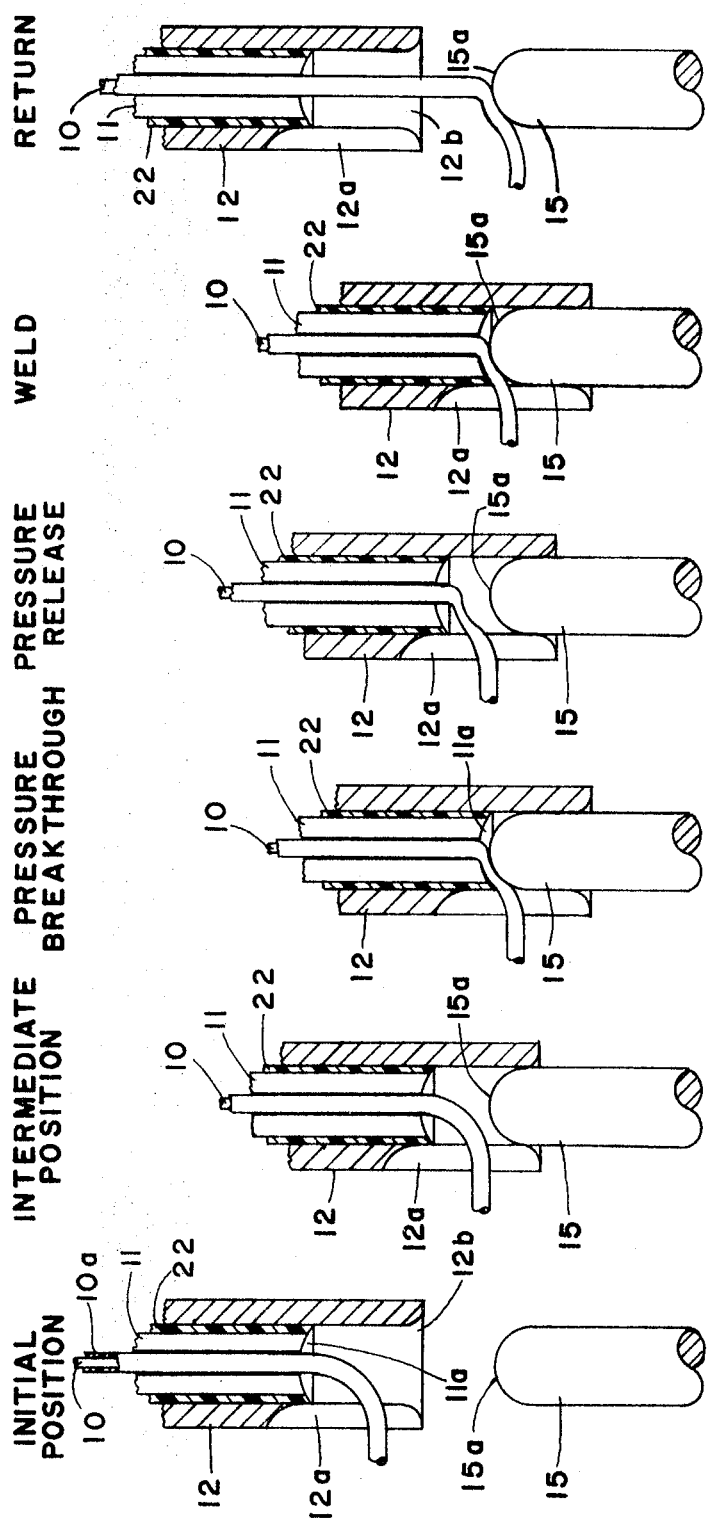

3,596,044

THROUGH INSULATION WELDING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to a welding apparatus and, more particularly, to an apparatus for sequentially welding a continuous insulated wire to terminals.

2. Description of the Prior Art

Complex electronic assemblies, using integrated circuit modules as sub-assemblies, include large numbers of closely spaced, miniature terminals which must be electrically interconnected for proper operation. Typically, interconnections are made by using continuous electrically conductive wires which are electrically connected to the terminals. Due to the proximity of the terminals to one another, an insulated wire is generally employed. Also, due to terminal proximity or spatial limitations between terminals, wire-wrap techniques cannot be utilized, and therefore, herebefore, welding techniques have been employed to electrically connect the insulated wire to the various terminals. However, before a proper weld connection can be achieved, it is necessary to remove a selected portion of the insulation from the wire so as to expose the wire, prior to welding it to each terminal.

In a typical prior art welding technique, in-line top and bottom welding electrodes are employed. Either the top or the bottom electrode is heated to soften the wire insulation and remove it to expose base wire which is then welded to the terminal. Such a welding technique has a few significant disadvantages or shortcomings, particularly when employed in extremely crowded confines, typical of present day complex terminal assemblies.

The main shortcoming of the prior art technique is the requirement that the terminal and the wire be aligned on a single axis, between two opposite electrodes. Another shortcoming is the removal of the insulation by means of heat from a heated electrode. A danger exists that the heated electrode may burn the insulation from adjacent wires on or near adjacent terminals. Also, since the insulation thickness on the wire is not always uniform, the amount of heat needed to melt the insulation, has to vary. Otherwise, the wires uniform electrical conductivity may be adversely affected. Thus, a need exists for a new welding apparatus which is not limited by the disadvantages characterizing devices which employ prior art heat-welding techniques.

OBJECTS AND SUMMARY OF THE INVENTION

It is a primary object of the present invention to provide a new welding apparatus.

Another object is to provide a new welding apparatus finding particular application in welding a continuous wire to terminals.

A further object of the present invention is to provide a new welding apparatus for welding a continuous insulated wire to closely spaced terminals.

These and other objects of the invention are achieved by providing a welding apparatus comprising a pair of welding electrodes, which are positioned on one side of a terminal, to which an insulated wire is to be welded. The electrodes are coaxial, with an inner electrode insulatably mounted within an outer electrode. The insulated wire is fed through an axial cavity in the inner electrode while a portion of the outer electrode is used to fit around the terminal to which the wire is to welded. The outer electrode fixes the positions of the wire and the inner electrode with respect to the terminal for insulation displacement and subsequent welding of the exposed wire to the terminals.

The insulation is displaced to expose bare wire by compressing the wire between the terminal and the inner electrode, by means of pressure applied to the electrodes during a first cycle of operation. Once the insulation is removed, the bare wire is welded to the terminal by the application of an appropriate potential or voltage across the two electrodes, with the outer electrode in direct electrical contact with the terminal, and the inner electrode in contact therewith through the exposed or bare wire.

The novel features of the invention are set forth with particularity in the appended claims. The invention will best be understood from the following description when read in conjunction with the accompanying drawings.

BRIEF DESCRIPTION OF THE DRAWINGS

FIG. 2 is an isometric view of the two electrodes forming the novel electrode assembly of the present invention;

FIG. 3a—3f are cross-sectional views useful in explaining the operation of one embodiment of the invention; and FIGS. 4a—4c are cross-sectional views, useful in explaining other embodiments of the invention.

DESCRIPTION OF THE PREFERRED EMBODIMENTS

Figure 1:
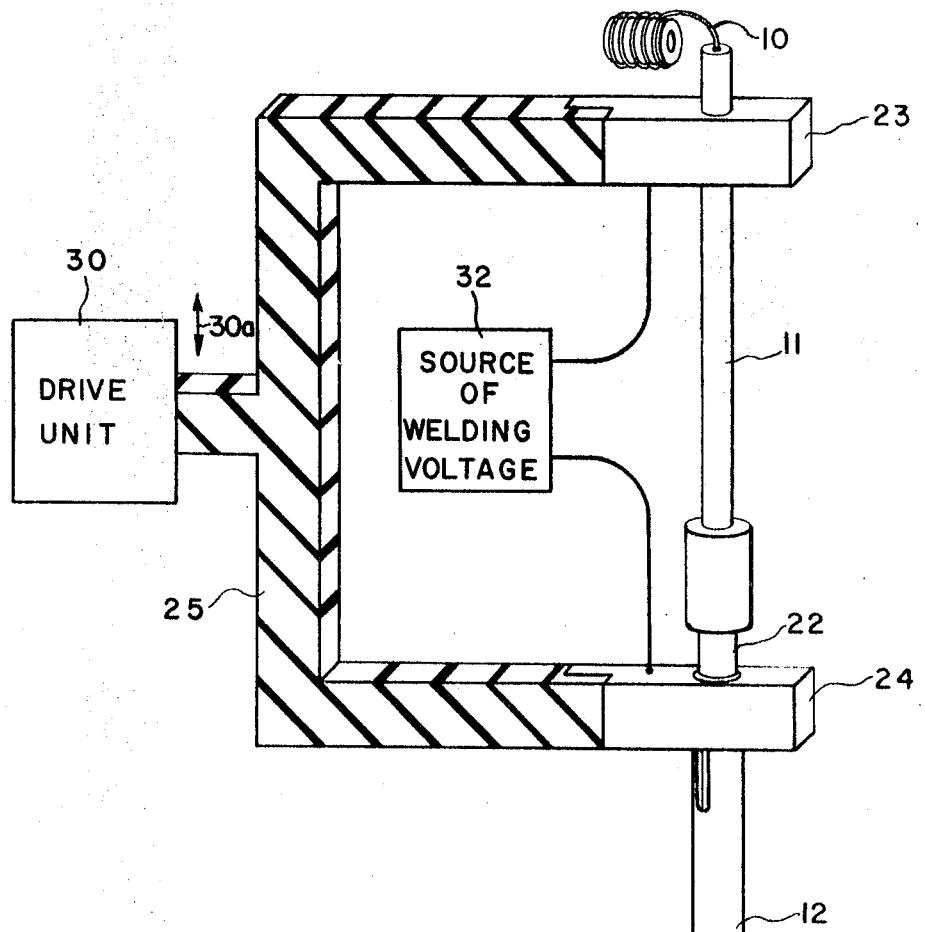
FIG. 1 is a combination isometric and block diagram of the novel apparatus of the present invention.

Referring to FIG. 1, therein reference numeral 10 designates an insulated, electrically conductive wire which is to be welded to terminals by means of a welding electrode assembly, comprising coaxially mounted electrodes 11 and 12. Four terminals, designated 15—18 are shown supported on a board 20. The terminals may comprise the lead terminals of any complex electronic assembly or subassembly, such as the terminals of an integrated circuit module. As shown, the two electrodes comprising the electrode assembly are supported above the board 20 rather than on opposite sides thereof, as is the case in prior art welding devices, in which the two welding electrodes are positioned on opposite sides of the terminals to which wire is to be welded.

The insulated wire 10, assumed to be supplied from a supply spool (not shown) is threaded through a hollow axial cavity in the inner electrode 11 and passes out of the outer electrode 12 through a slot 12a to a previously made connection or weld, between the wire and one one of the terminals, such as terminal 16. The inner electrode 11 is surrounded by a sleeve 22 to provide electrical insulation between the two electrodes, when electrode 11 is coaxially supported within the outer electrode 12. The two electrodes are shown disassembled in FIG. 2.

The two electrodes are maintained in coaxial alignment by means of electrically conductive brackets 23 and 24 which, for explanatory purposes, are assumed to be fixedly supported with respect to one another by a member 25, which is formed of an electrically nonconductive material. Member 25 is shown coupled to a drive unit 30. The function of unit 30 is to apply forces to the support member 25 and thereby to the electrode assembly to sever the wire insulation and during the actual welding operation. In practice, unit 30 lowers and raises the support member 25 as indicated by arrow 30a, and thereby lowers and raises the electrode assembly potential purposes, to be explained hereafter in detail. Brackets 23 and 24 are electrically connected to a source of welding potential or voltage 32 which is assumed to provide the welding pulse during the welding operation.

The manner in which the electrode assembly, shown in FIG. 1, coacts with a terminal to sever the insulation of wire 10 and to weld the wire to the terminal may best be explained in conjunction with FIGS. 3 (a)—3 (f). These Figures represent cross-sectional views of the electrode assembly and terminal 15, to which wire 10 is to be welded, during different phases of a complete operation. In FIG. 3 (a) the wire insulation is shown and is designated by numeral 10a. As seen from these Figures, the inner electrode 11 is positioned within the outer electrode 12 so that the welding tip or end 11a of inner electrode 11 is axially displaced from end 12b of electrode 12, nearest to the terminal top 15a. Thus, a portion of the inner cavity of electrode 12 is hollow. The function of this hollow portion of the cavity is to accommodate the terminal therein when the electrode assembly is forced downwardly thereonto by a downward force from unit 30.

As will be appreciated from the following description, this enables the electrode assembly to be piloted onto the terminal which lessens alignment problems. Also, as the electrode 12 descends on the terminal 15, it clears the top 15a of all previous wires which may have been wired thereon, thereby preventing any interferences with the current weld. In addition, by accommodating the terminal within the cavity of electrode 12, a good electrical contact is created between the inner surface of the electrode 12 and the terminal 15 for the application of the welding pulse.

FIG. 3 (a) represents an initial position such as is diagrammed in FIG. 1 in which the electrode assembly is above a terminal before the welding operation is initiated. In this position, the wire 10 extends outwardly to a previous weld through the slot 12a (as well as through the inner electrode 11) to the supply spool. When the apparatus is operated, the electrode assembly is forced downwardly onto the terminal to first sever the wire's insulation and thereafter weld the exposed wire to the terminal. The assembly is forced downwardly by a force applied to member 25 by drive unit 30.

As seen from FIG. 3 (b), which represents an intermediate position of the assembly as it is forced downwardly, the end 12b of electrode 12 is large enough to enable the terminal 15 with its top 15a to be accommodated with the hollow cavity of the electrode 12. The magnitude of the downward force and the rate at which it is applied are chosen so that as the assembly continues to move downwardly, at some point during the downward motion, the wire 10 is compressed between the top 15a of terminal 15 and the tip 11a of electrode 11. The compression forces are such that they rupture or sever the wire insulation and displace it, forcing exposed wire to come in contact with the top 15a and the electrode tip 11a.

In practice, the force with which the assembly is force downwardly to sever the wire insulation depends on the shapes of the terminal top and the electrode tip between which the wire is compressed, as well as the type of insulation material to be ruptured and its average thickness. In the various Figures, the terminal top 15a is shown having a convex top and the electrode tip 11a is shown having a concave surface. Though such shapes may be deemed as preferable, the invention is clearly not limited thereto.

The downward force necessary to rupture the insulation is generally greater than that required during the actual welding. Thus, if desired, the system may be operated so that after the insulation is ruptured [FIG. 3 (c)], the drive unit 30 (FIG. 1) raises the assembly [unit 30 lowers the assembly [FIG. 3 (e)] with a sufficient downward force in which the exposed wire is in contact with both the tip 11a of electrode 11 and with outer electrode 12 through terminal 15 which is in electrical contact with the inner surface of the latter. It is at this point that a welding pulse is applied to the two electrodes by source 32 to produce the desired weld.

Once the weld is produced, unit 30 raises the assembly off terminal 15 [In this position the wire 10 extends from the weld on terminal 15 through the inner electrode 11 to the supply spool. After completing the weld, the assembly is moved to a position above a next terminal to be welded. Just before the welding operation is to be initiated, the wire 10 is moved into the slot 12a of the outer electrode 12, as shown in FIG. 3 (a). Moving the wire into slot 12a may be achieved by means of a mechanical finger (not shown) or any other mechanical arrangement.

In the foregoing, the invention has been described in connection with a cylindrically shaped terminal in which case the hollow cavity of the outer electrode 12 and the inner electrode 11 are cylindrically shaped. Clearly, however, if terminals of other shapes ar to be welded, the shapes of the electrodes are chosen to conform thereto. Also, herebefore the invention has been described in connection with terminals having convex tops to which wires are to be welded. If desired, the electrode assembly may be modified, as will be explained hereafter, to weld wires to terminals with concave tops.

Attention is now directed to FIGS. 4 (a) and 4 (b) which are cross-sectional views of a modified electrode assembly for use to weld wire 10 in a cavity 40 at a top 42 of a terminal 45. FIG. 4 (a) is a cross-sectional view with the assembly in an initial position above the terminal, while FIG. 4 (b) is a cross-sectional view of the assembly in a position at which the insulation is severed, or during welding. From the foregoing description it should be apparent to those familiar with the art that in the embodiment, shown in FIGS. 4 (a) and 4 (b) the cross section of the outer electrode is chosen so that its outer surface makes contact with the surface of the cavity 40 as the assembly is lowered into it. Also, the inner electrode 11, instead of occupying only a portion of the inner cavity of electrode 12 [See FIGS. 3 (a) —3 (f) ] in order to provide space for the terminal to be accommodated in the outer electrode, fills the outer electrode inner cavity. The welding tip 11 a of electrode 11 preferably extends out of electrode 12 so as to provide a surface against which the wire is squeezed during insulation severance and during welding. Slot 12a is used to provide space for the wire 10 to extend to a previous weld when the electrode assembly is forced into the cavity 40 of the terminal 45.

FIG. 4 (c) is a cross-sectional view of yet another embodiment in which the outer electrode 12 makes contact with the top 42 of the terminal 45. In such an embodiment it would be preferable to move the two electrodes independently of one another, rather than as a single assembly. Unit 30 (FIG. 1) may be utilized to provide independent forces to each of the two electrodes.

Since the novel welding system of the present invention includes an electrode assembly in which the two welding electrodes approach the terminals from one side, the system lends itself to automation. For example, by adding a numerically controlled X—Y table on which the system may be positioned, the assembly may be automatically moved from terminal to terminal. Once positioned above each terminal the steps of severing the insulation followed by the actual welding may be automatically performed.

Although particular embodiments of the invention have been described and illustrated herein, it is recognized that modifications and variations may readily occur to those skilled in the art and, consequently, it is intended that the claims be interpreted to cover such modifications and equivalents.

I claim:

1. A wire welding apparatus comprising:
   an electrode assembly including a first elongated electrode, a second elongated electrode concentrically supported within said first electrode, and insulating means between said first and second electrodes for electrically insulating said electrodes from one another, said second electrode defining an axial opening extending from a first end of said first electrode to an opposite second end thereof to accommodate therein an electrical wire covered with electrical insulating material;
   a terminal to which said wire is to welded;
   means for lowering said assembly onto said terminal, whereby said first electrode is brought into direct physical and electrical contact with said terminal and said wire is pressed between said first end of said second electrode and said terminal, said assembly being lowered with a force sufficient to cause the rupturing of said insulating material on the wire portion which is pressed only between said terminal and said second electrode; and
   electrical power means for applying a potential difference between said first and second electrode for welding said wire to said terminal by current flowing between said electrodes through said wire portion at which the insulating material was ruptured, and said terminal, said second electrode and said insulating means being positioned in said first electrode, whereby the first electrode defines an axial cavity extending inwardly from an open end of said first electrode, which is in contact with said terminal when said assembly is lowered thereonto, said first electrode further defining a slot extending from said axial cavity to the exterior of said first electrode, with said wire being accommodated in said assembly with a first end portion thereof extending to the exterior of said assembly through said slot and a second opposite end portion extending to the exterior of said assembly through the second end of said second electrode.

2. The arrangement as recited in claim 1 wherein the inner dimension and cross section of the axial cavity of said first electrode are a function of the outer dimension and cross section of said terminal; whereby when said first electrode is in direct contact with said terminal, the terminal has a portion thereof extending into the axial cavity of said first electrode with the outer surface of said terminal in direct physical and electrical contact with an inner surface of said first electrode.

3. An apparatus for welding an insulated electrically conductive wire to an electrically conductive terminal comprising:

a first elongated electrically conductive electrode having an interior surface defining an axial cavity extending from a first end to a second open end, and further defining a slot near said second end extending from the axial cavity to the exterior of said electrode;

a second elongated electrically conductive electrode defining an axial opening extending from a first end to a second exposed end which defines a welding tip;

electrically insulating material covering the outer surface of said second electrode between said first and second ends, said second electrode being concentrically disposed in the axial cavity of said first electrode with the insulating material therebetween and with the second exposed end of said second electrode toward said open end of said first electrode, adjacent said slot in said second electrode, the slot and the axial cavity of the second electrode having dimensions to accommodate therein an electrically conductive wire with electrically insulating material thereon, said wire extending through the first end of said second electrode, its axial cavity, its welding tip, the axial cavity of said first electrode and through said slot to the exterior of said first electrode;

driving means for urging at least said second electrode toward said terminal with a force sufficient to rupture the insulating material of only a portion of said electrical wire which is disposed between and in contact with said welding tip of said second electrode and a top end of said terminal whereby said electrical wire provides an electrical path therebetween; and means for applying a potential across said first and second electrodes for welding said electrical wire to the top end of said terminal when said first electrode is in direct physical and electrical contact with said terminal and said top end of said terminal is in electrical contact with the welding tip of said second electrode through said electrically conductive wire.

4. The arrangement as recited in claim 3 wherein said driving means drive said first electrode to be in direct contact with said terminal and wherein the welding tip of said second electrode is exposed within said axial cavity of said first electrode, the cross section of said cavity of said first electrode and its dimensions are a function of the cross section and dimensions of said terminal which is accommodated in the axial cavity of said first electrode, whereby the terminal is in direct electrical and physical contact with the interior surface of said first electrode.

5. The arrangement as recited in claim 3 wherein said driving means drive said first electrode to be in direct contact with said terminal and wherein the welding tip of said second electrode is exposed through the open end of said first electrode, and the cross section and dimensions of said first electrode are a function of the cross section and dimensions of a cavity in the top of said terminal whereat said wire is to be welded, whereby the outer surface of said first electrode is in direct electrical and physical contact with the peripheral surface of the cavity in said terminal, when said first electrode is in contact with said terminal.

6. The arrangement as recited in claim 3 wherein said driving means first urge at least said second electrode toward said terminal with a first force and thereafter lower said first and second electrodes onto said terminal with a second force less than said first force prior to the application of said potential difference.

7. An apparatus for welding a wire to a terminal comprising:
an electrode assembly including a first elongated electrode, a second elongated electrode concentrically supported within said first electrode, and insulating means between said first and second electrodes for electrically insulating said electrodes from one another, said second electrode defining an axial opening extending from a first end of said first electrode to an opposite second end thereof to accommodate therein an electrical wire covered with electrical insulating material;

means for lowering said assembly onto said terminal, whereby said first electrode is brought into direct physical and electrical contact with said terminal and said wire is pressed between said first end of said second electrode and said terminal, said assembly being lowered with a force sufficient to cause the rupturing of said insulating material on the wire portion which is pressed only between said terminal and said second electrode; and electrical power means for applying a potential difference between said first and second electrode for welding said wire to said terminal by current flowing between said electrodes through said wire portion at which the insulating material was ruptured, and said terminal, said means for lowering first lower said assembly with a first force sufficient to cause the rupturing of said insulating material and thereafter raise said assembly and lower it for a second time with a second force smaller than said first force prior to the application of said potential difference by said electrical power means.

8. An apparatus for welding an electrically conductive wire, coated with electrical insulating material to a terminal, comprising:

an electrode assembly comprising first and second electrodes;

assembly drive means coupled to said assembly for driving at least said first electrode toward said terminal with a first force, with the insulated wire between said first electrode and said terminal whereby said insulating material is ruptured when said wire is pressed between said first electrode and said terminal, so that the wire provides an electrical path between said first electrode and said terminal, for then relieving the force between the wire and said terminal to a second force having a value less than said first force, and for then driving said first and second electrodes toward said terminal with a third force, less than said first force and greater than said second force, whereby said wire and said terminal provide an electrical path between said first and second electrodes; and power means for providing electrical power between said first and second electrodes when said wire and said terminal provide an electrical path therebetween.

9.

A method of welding an electrically conductive wire, coated with electrical insulating material to an electrically conductive terminal, the steps comprising:

stringing the wire through a first elongated welding electrode which has a welding tip and which is concentrically and insulatingly mounted in a second welding electrode;

lowering at least the first electrode onto the terminal with sufficient force so that a portion of the wire is caught between the welding tip and the terminal, the force being sufficient to rupture the insulating material at said wire portion;

raising at least the first electrode followed by lowering the two electrodes with a second force less than said first force so that the first electrode is in contact with the terminal through said wire and the second electrode is in direct contact with said terminal; and applying a welding pulse to the two electrodes, when the welding tip of the first electrode is in electrical contact with the terminal through the electrically conductive wire, and the second electrode is in direct physical and electrical contact with the terminal.

10. A method of welding an electrically conductive wire, coated with electrical insulating material to an electrically conductive terminal, by means of a welding assembly which includes first and second electrodes, the steps comprising:

directing at least the first electrode to the terminal with a first force so that a portion of the wire is caught between the first electrode and the terminal, the first force being sufficient to rupture the insulating material at said wire portion;

withdrawing at least said first electrode from the terminal;

directing said first and second electrodes to said terminal with a second force to bring said first electrode in physical and electrical contact with said terminal through said wire and said second electrode with said terminal whereby the wire and the terminal provide an electrical path between said first and second electrodes; and applying a welding potential between said first and second electrodes.

11. A method of welding an electrically conductive wire, coated with electrical insulating material to an electrically conductive terminal, by means of a welding assembly which includes first and second electrodes, the steps comprising:

directing said first and second electrodes toward said terminal to bring said first electrode in contact with said terminal through a portion of said wire and said second electrode in direct contact with said terminal, said first electrode being directed to said terminal with a first force sufficient to rupture the insulating material at said wire portion;

then maintaining the first electrode in contact with said terminal with a second force which is less than said first force;

then applying a third force to the terminal through at least the first electrode which is less than the first force and greater than the second force; and applying a welding potential between said first and second electrodes, while said second electrode is in direct contact with said terminal and said first electrode is maintained in contact with said terminal through said wire portion with said third force.